United States Patent Office 3,303,878
Patented Feb. 14, 1967

3,303,878
METHOD OF IMPROVING INJECTIVITY OF INPUT WELLS IN WATERFLOOD PROCESS
Carl Connally, Jr., Dallas, Tex., assignor to Mobil Oil Corporation, a corporation of New York
No Drawing. Filed Aug. 27, 1963, Ser. No. 304,971
8 Claims. (Cl. 166—9)

This invention relates to the secondary recovery of oil from a subterranean formation by a waterflood process. More specifically, this invention relates to improving the injectivity of water into input wells in a waterflood process.

Recovery of oil from subterranean formations is preferably accomplished by permitting native reservoir energy to displace the oil from the formations through one or more producing wells. Unfortunately, such means of oil production does not, in most cases, remove more than a minor portion of the oil within such a formation. In order to improve the recovery of oil, it is common practice to supplement the native reservoir energy by various means including the use of water to displace oil from a formation.

A waterflood process, briefly, comprises introducing water into a formation through at least one input well, forcing the water through the formation toward at least one output well, and recovering through the output well the oil which is displaced from the formation by the water. One of the principal problems encountered in waterflooding is the economical injection of a sufficient quantity of water to carry out the process. It is believed that one of the principal factors which hinders the entry of water into the formation around an input well is the presence of oil in the formation. A condition of oil-saturation in porous rock material substantially reduces the effective permeability of the rock to the flow of water.

It is one object of the present invention to improve the injectivity of water into an input well in a waterflood type of secondary recovery process. It is another object of the invention to reduce the oil saturation in the portion of an oil-bearing formation surrounding an input well utilized in carrying out a waterflood process.

In accordance with the invention, the injectivity of water into an input well is improved by introducing into the formation around the input well in advance of a waterflood a minor amount of liquid ammonia at a pressure sufficient under formation temperature to maintain the ammonia in the liquid state within the formation. In accordance with another aspect of the invention, water injectivity into an input well is improved by introducing into the formation through the input well a minor amount of a liquid hydrocarbon material followed by a minor amount of liquid ammonia. In accordance with a still further aspect of the invention, water injectivity into an input well is improved by introducing in advance of a waterflood a minor amount of a mixture of a liquid hydrocarbon and liquid ammonia.

The selection of the particular embodiment of the invention to be employed may be based upon the temperature of the formation in which the waterflood process is to be carried out. Where the formation temperature exceeds about 170° F., it is preferred that the formation around the input well be treated by the use of liquid ammonia alone. The liquid ammonia is introduced into the input well and forced into the formation adjacent thereto in an amount ranging from about 1 to about 10 barrels, preferably less than about 5 barrels, per foot of formation thickness. The term "formation thickness" refers to the thickness of the oil-bearing formation which is to be treated by the waterflood process. As a practical matter, this will be the thickness of the oil-bearing formation at the location penetrated by the input well and into which thickness of formation the injected water in the waterflood process is introduced. For example, if an oil-bearing formation is 10 feet thick at the position penetrated by an injection well, the quantity of ammonia to be introduced would range from approximately 10 barrels to about 100 barrels. The ammonia is introduced in the liquid state at a pressure which will maintain the ammonia above its vapor pressure at the particular temperature of the formation into which the ammonia is being forced. Following the introduction of the ammonia, a waterflood process is carried out in a conventional manner.

In those instances where the formation to be treated is at a temperature below about 170° F., the injected materials preferably comprise both a liquid hydrocarbon and liquid ammonia. The liquid hydrocarbon may be a liquefied, normally gaseous hydrocarbon, such as LPG, or a low-boiling, normally liquid hydrocarbon, such as naphtha. The liquid hydrocarbon is introduced into the formation through the input well in an amount ranging from about 1 to about 10 barrels, preferably less than 5 barrels, per foot of formation thickness to be treated. Liquid ammonia in similar amounts is then introduced into the formation through the input well. Generally, substantially equal amounts of liquid hydrocarbon and liquid ammonia may be used, though the relative amounts of liquid hydrocarbon and liquid ammonia may vary, on a liquid volume basis, from about 10 volumes to about 0.1 volume of liquid hydrocarbon per each volume of liquid ammonia. During the introduction into the formation of both the liquid hydrocarbon and the liquid ammonia, a pressure is maintained on the input well in excess of whichever is greater, the vapor pressure of the liquid hydrocarbon or the vapor pressure of the liquid ammonia at formation temperature in order to maintain both of the materials in the liquid state. If desired, the injection procedure may be simplified by premixing the liquid hydrocarbon and liquid ammonia prior to the introduction of the materials into the input well. Subsequent to the displacement of the liquid hydrocarbon and liquid ammonia into the formation around the input well, a conventional form of waterflood is carried out.

The selection of the amount of treating materials to be used is dependent upon the permeability of the formation being treated. Larger quantities of the material will be required for more porous formations since larger volumes of oil-filled voids will be present. By the same token, tight formations of low porosity wil require amounts in the lower end of the stated range.

The treatment of the formation in accordance with the above-discussed procedures affects the oil content of the formation around the input well for a radial distance of from about 20 feet to about 50 feet. While it has been known to miscibly displace oil from throughout a formation using both liquid hydrocarbons and liquid ammonia, it is necessary in carrying out such procedures that quite large quantities of the miscible materials be used. In the present procedure, which is directed solely to improving the injectivity of an input well in a waterflood process, the quantities of materials are so minor that the total quantity of treating material injected may not exceed 0.1 percent of the hydrocarbon pore volume of a formation between an input well and an output well, and the quantity of liquid ammonia employed is no greater than 0.5 percent of such pore volume. In this instance, the term "hydrocarbon pore volume" refers to that portion of the total pore volume in the formation between the input and output wells which is swept by the water used in the waterflood process. The lower limits of the amount of material injected for treating the formation around the input well are about 0.0001 percent of such pore volume. By using such minor amounts of treating material, the oil present within the formation around the input well is effectively removed to a distance which substantially increases the injectivity of water into the formation and yet the treating materials are rapidly dissipated or dispersed as the waterflood progresses. Even with the use of the maximum amount of ammonia, dispersion of the ammonia is accomplished at a radial distance of no greater than about 50 feet from the input well.

Laboratory displacement experiments in porous rock materials using liquid ammonia alone and using liquid ammonia preceded by LPG or naphtha and followed by water have resulted in almost complete displacement of residual oil from the formation around the input well, leaving the rock material almost completely saturated with water and thus reducing the pressure required to force water to flow through the rock material. It thus becomes feasible to waterflood a formation which otherwise could not economically be produced by this process.

While the above procedural treatments have been discussed in terms of their being applied previous to the inauguration of a waterflood, it is to be understood that such treatments may be employed at any stage during the carrying out of a waterflood when it is indicated that the injectivity of the water into the input well or wells has been reduced to a level which might jeopardize the continuing of the waterflood process.

What is claimed is:

1. In the secondary recovery of oil from a subterranean formation penetrated by at least one input well and one output well wherein water is introduced into said input well and forced through said formation to displace oil from said formation through said output well, the step of increasing the injectivity of said water into said input well which comprises injecting through said input well into the portion of said formation surrounding said input well liquid ammonia in an amount ranging from about 1 barrel to about 10 barrels per foot of thickness of said formation to be treated, said ammonia being injected at a pressure in excess of the vapor pressure of said ammonia at the temperature of said formation.

2. The method according to claim 1 wherein the quantity of said ammonia is less than about 5 barrels per foot of thickness of the portion of said formation to be treated.

3. In the secondary recovery of oil from a subterranean formation penetrated by at least one input well and one output well wherein water is introduced into said input well and forced through said formation to displace oil from said formation through said output well, the method of increasing the injectivity of said water into said input well which comprises:

(a) injecting through said input well into the portion of the formation surrounding said input well liquid hydrocarbon in an amount ranging form about 1 to about 10 barrels per foot of thickness of said formation to be treated; and (b) injecting through said input well into said portion of said formation behind said liquid hydrocarbon liquid ammonia in an amount ranging from about 1 to about 10 barrels per foot of thickness of said formation to be treated, said liquid hydrocarbon and said liquid ammonia being introduced into said portion of said formation at a pressure in excess of the greater of the vapor pressures of said ammonia and said liquid hydrocarbon at the temperature of said formation.

4. The method according to claim 3 wherein the ratio of the amounts of liquid hydrocarbon and liquid ammonia range from about 10 volumes to about 0.1 volume of liquid hydrocarbon per volume of liquid ammonia.

5. The method according to claim 3 wherein the quantities of liquid ammonia and liquid hydrocarbon are substantially equal.

6. In the secondary recovery of oil from a subterranean formation penetrated by at least one input well and one output well wherein water is introduced into said input well and forced through said formation to displace oil from said formation through said output well, the step of increasing the injectivity of said water into said input well which comprises injecting through said input well into the portion of said formation surrounding said input well a mixture of liquid hydrocarbon and liquid ammonia in an amount ranging from about 1 barrel to about 10 barrels of liquid ammonia and from about 1 barrel to about 10 barrels of liquid hydrocarbon per foot of thickness of said formation to be treated, said mixture being injected at a pressure in excess of the greater of the vapor pressures of said hydrocarbon and said ammonia whereby said mixture is retained in the liquid state within said formation.

7. The method according to claim 6 wherein the ratio of the amounts of liquid hydrocarbon and liquid ammonia range from about 10 volumes to about 0.1 volume of liquid hydrocarbon per volume of liquid ammonia.

8. The method according to claim 6 wherein the quantities of liquid ammonia and liquid hydrocarbon are substantially equal.

References Cited by the Examiner

UNITED STATES PATENTS

| 2,721,164 | 10/1955 | Fenske. | |
| 2,776,714 | 1/1957 | Stanclift et al. | 166—42 |
| 2,830,018 | 4/1958 | Thompson et al. | 166—42 X |
| 3,016,351 | 1/1962 | Hessel et al. | 166—9 X |
| 3,064,732 | 11/1962 | Bernard et al. | 166—9 X |

OTHER REFERENCES

Fenske et al.: A. I. Ch. E. Journal, vol. 1, 1955, pp. 335–341.

Slobod: A Review of Methods Used To Increase Oil Recovery, February 1958, p. 26.

ERNEST R. PURSER, *Primary Examiner.*

CHARLES E. O'CONNELL, *Examiner.*

T. A. ZALENSKI, *Assistant Examiner.*